455-600 AU 233 EX

FIP8106 OR 3,166,672

[redacted] 230

Jan. 19, 1965 C. B. GARDNER 3,166,672

SYSTEM FOR TRANSMITTING MESSAGES BY MEANS OF COLORED BEAMS OF LIGHT

Filed Feb. 16, 1960 3 Sheets-Sheet 1

INVENTOR.
CHARLES B. GARDNER
BY
Benj. T. Rauber
ATTORNEY

INVENTOR.
CHARLES B. GARDNER
BY
Benj. T. Rauber
ATTORNEY

INVENTOR.
CHARLES B. GARDNER
BY
Benj. T. Rauber
ATTORNEY

1

3,166,672
SYSTEM FOR TRANSMITTING MESSAGES BY MEANS OF COLORED BEAMS OF LIGHT
Charles B. Gardner, Catskill, N.Y.
(3914A S. Ledbetter, Dallas, Tex.)
Filed Feb. 16, 1960, Ser. No. 9,136
17 Claims. (Cl. 250—199)

My invention relates to a system for transmitting messages from one station to one or more receiving stations. More particularly it relates to sending messages over a distance by means of colored light signals.

The system of my invention provides means by which two or more persons may communicate with and send messages to each other without the possibility that others may receive the messages. The system and the apparatus comprised in it are such that each or both of the persons may use it without the necessity of learning a code. It is simple in construction and may be transported and may be used either at night or in the daytime.

In the system of my invention, the sender of the message is provided with a series of color panels, each panel having a distinctive color and hue different from the others and marked by an identifying character, such as a letter, number or other indicia. The letters may be from A to Z and the numerals from 0 to 9. Other indicia may be punctuation marks, geometric figures or other signs. The panels of the sender are arranged to be moved into the path of a beam of white light in a sequence according to the message to be sent and in such position to be directed to the receiver. The receiver is similarly provided with a corresponding series of panels and identifying characters and arranged so that a matching color and shade may be brought into the path of the light beam and the identifying character read and recorded. In use, the sender selects, successively, panels carrying the successive letters, numerals or indicia of the message and the receiver moves panels of matching color and hue into or near the transmitted color beam as the sending panels are moved into the beam of white light and may then be read and the message recorded.

The beam of white light may be of any source, either daylight or a lamp. It need not be perfectly white provided both the sender and the receiver have light of equal whiteness to illuminate their panels for matching the colors. Known optical means, such as concave reflectors or condensing lenses may be used to concentrate and direct the light. The color panels may be such as to reflect the light or to transmit it through a suitably colored transparent area. The light may be sent directly to the receiver or indirectly by reflection from a surface such as a snow bank, building or cloud. It may be sent to more than one receiver. It will be apparent that anyone not provided with the color panels and indicating characters will not be able to detect or "listen" in to the message.

The various features of my invention are illustrated by way of example in the accompanying drawings, in which:

FIG. 1 is a vertical view from the side nearest the sender or receiver of the panel arrangement in which the color panels are in the form of a strip, FIG. 2 is a vertical view from the opposite side, FIG. 3 is a plan view of the panels, FIG. 4 shows the positions for sending and receiving, FIG. 5 is a plan view of a modification in which the panels are arranged in the form of a cylinder or polygon about an axis of rotation,

2

Figures 6, 7, 8:
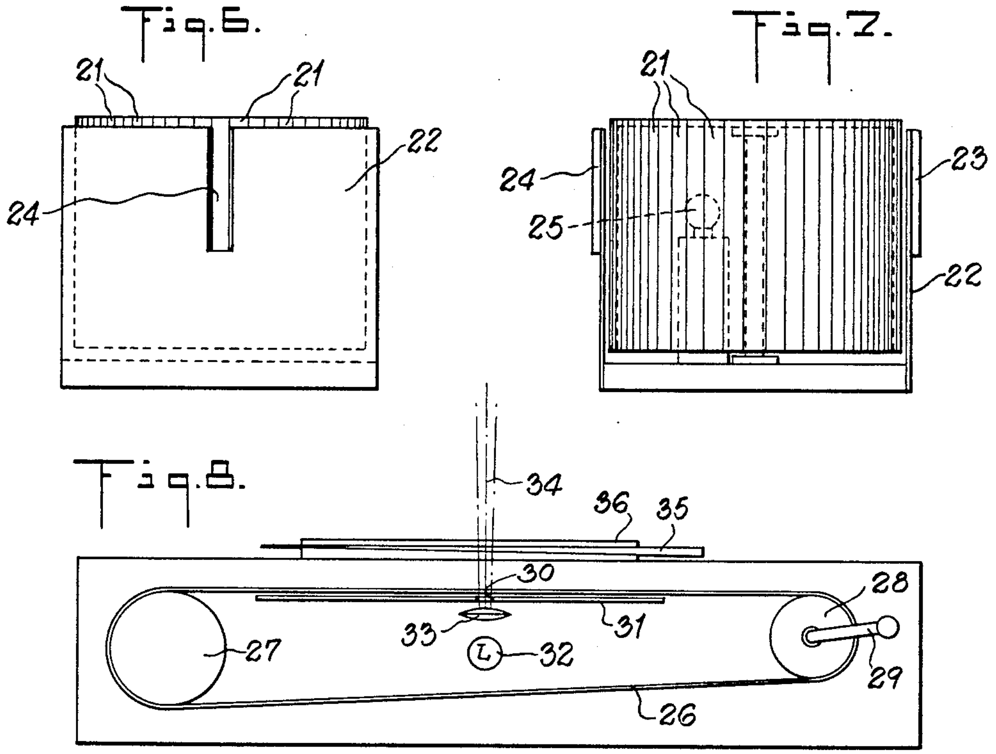
FIG. 6 is a front elevation of the modification shown in FIG. 5.
FIG. 7 is a side view of the modification shown in FIG. 5.
Figure 9:
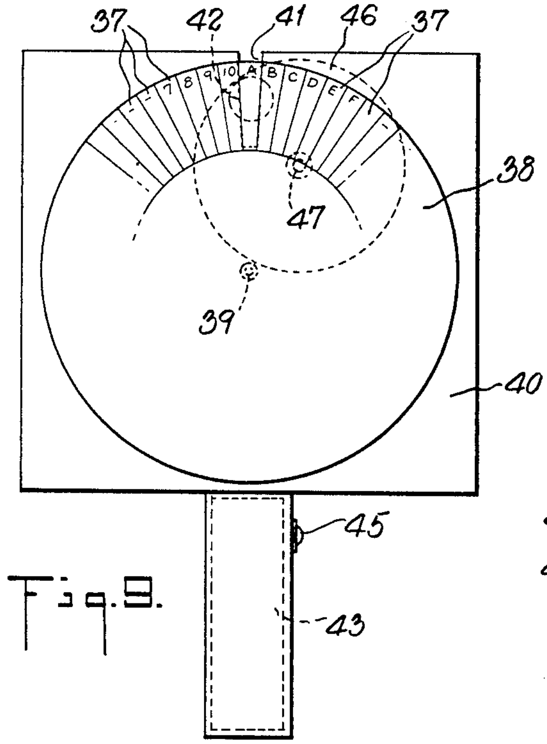
Figure 10:
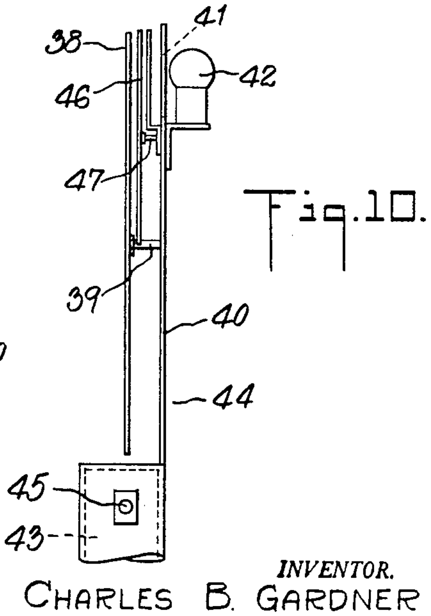
Figure 11:
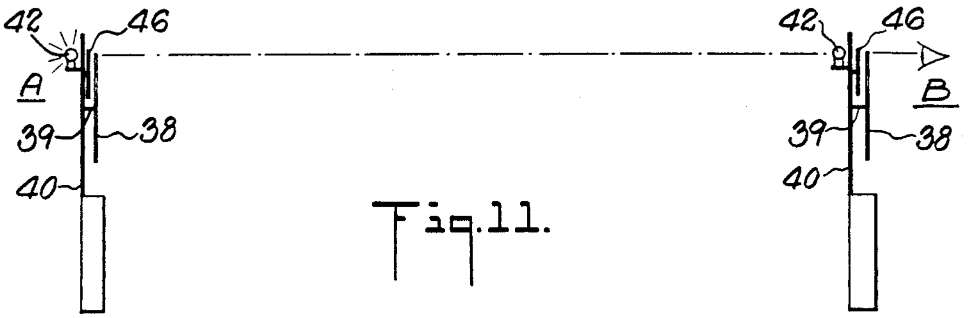
Figure 12:
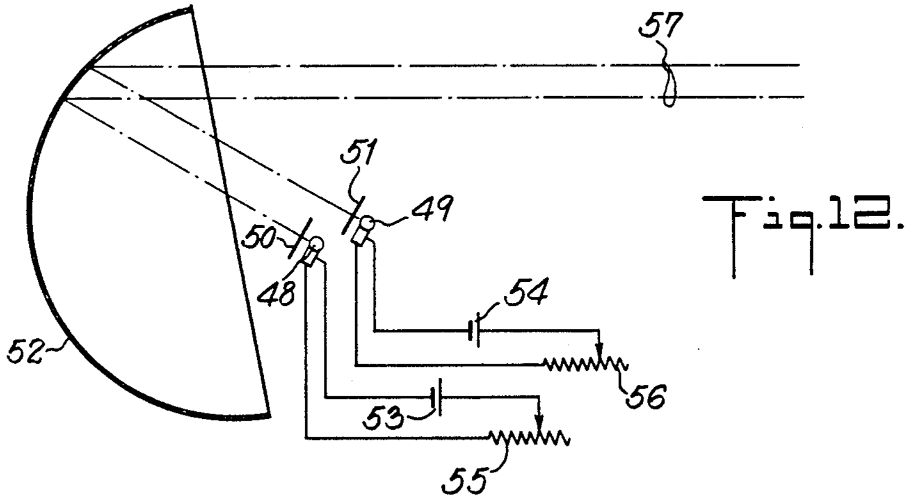
Figure 13:
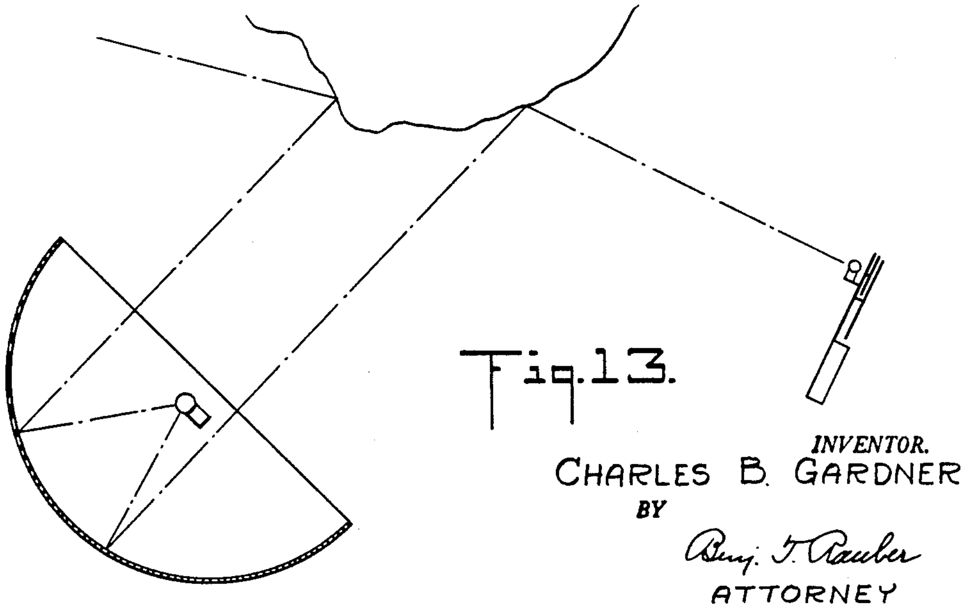

FIG. 8 is a plan of another modification in which the panels are arranged in the form of an endless belt about a pair of spaced supporting pulleys, FIG. 9 is a front view of still another modification in which the panels are arranged to form an annular plate about an axis normal to the plane of the plate, FIG. 10 is a side view of the modification shown in FIG. 9, FIG. 11 is a side view of the panels arranged for sending a message, FIG. 12 is a view of an embodiment in which the color light beam is formed by two or more lights arranged to project light of different color and intensity to form a color beam of a shade corresponding to a corresponding identifying character and a reflector to condense and direct the resulting color beam, and, FIG. 13 is a diagrammatic sketch showing the reflection of a color light beam from a surface between the sender and receiver.

Referring more particularly to the embodiment of my invention shown in FIGS. 1 to 4, a strip 15 of different color panels 16 having identifying characters 17 is mounted on a holder 18 having a notch 19 and a tongue 20 to support the strip at the notch or slot. The colors may be selected for distinctiveness. For example, the first panel carrying the identifying character "1" may have the color 5 red on the Munsell color system, the panel carrying the character 2 may have the color 2.5 green yellow, etc. The colors are selected for maximum chroma as shown in the Munsell color system.

Figures 1, 2, 3, 4:
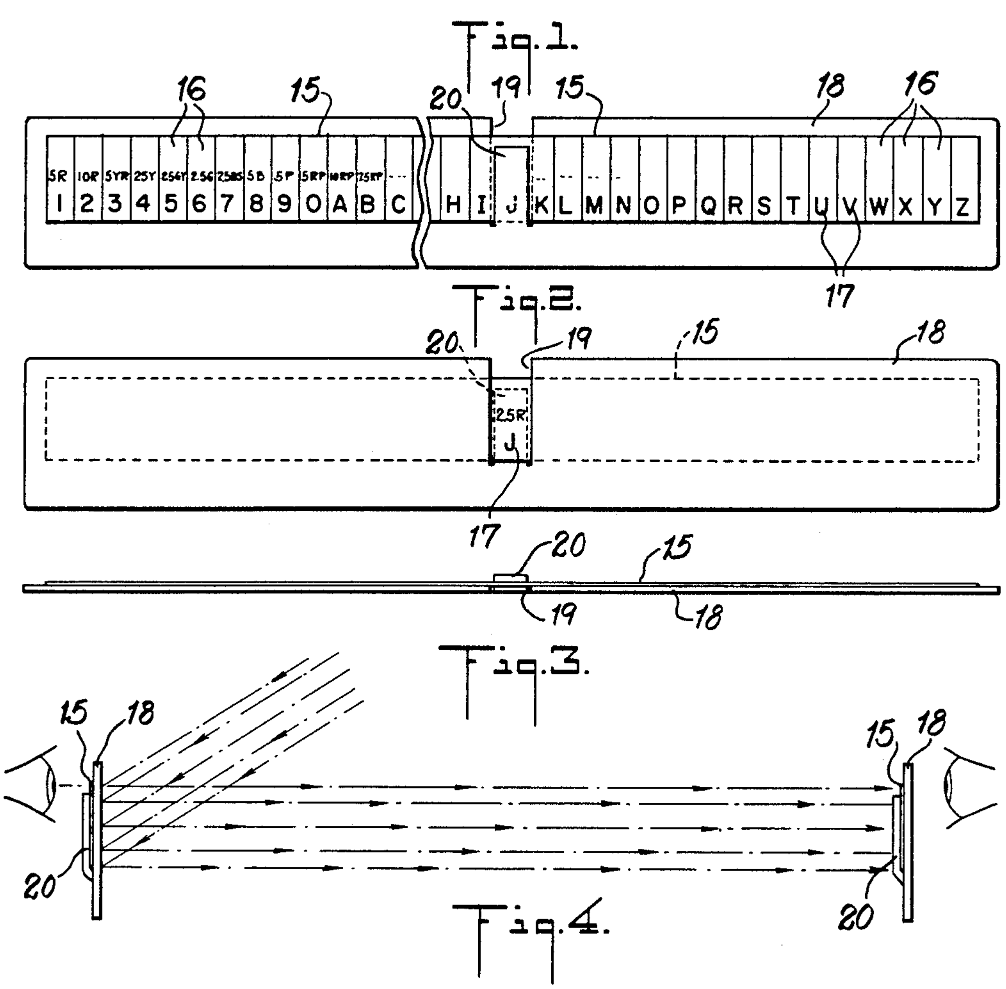

In using the system as shown in FIG. 4, a beam of light, which may be sunlight or a white light from a suitable lamp, is reflected from a sending station at the left to the receiving station at the right. The color of the reflected beam is the color of the panel. The receiver at the right moves the strip until he finds a panel of a color to match the light and then may read and record the identifying character marked on this panel. This is repeated until the succession of numbers or letters and other characters spells out the message. Related color panels may be grouped to enable the receiver to find them more easily and quickly for matching. For example, different hues of blue, blue green, green, etc. may be grouped together.

The strip 15 may be of any suitable material and, if the light is to be transmitted through the strip instead of reflected from it, may be of colored transparent or translucent material such as glass or a transparent or translucent plastic.

Figure 5:
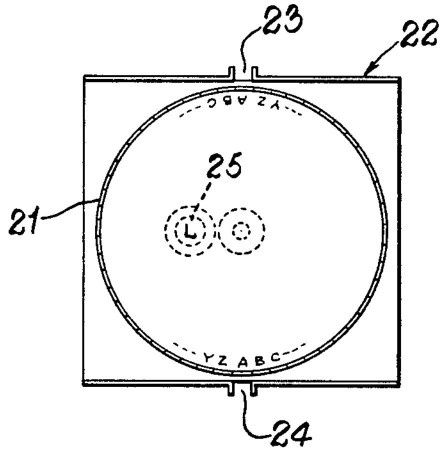

In the embodiment shown in FIGS. 5, 6 and 7, the color panels are transparent and are arranged in a polygonal or cylindrical form 21 supported to be rotatable on its axis on a suitable support. It is enclosed in a box or housing 22 having slots 23 and 24 in opposite sides, through one of which it may be viewed and through the other of which light from a lamp 25 passes, having passed through a panel aligned with the slot. The identifying character of the lighted panel may be placed on the diametrically opposite side of the cylinder so that it may be viewed from the side of the apparatus opposite that from which the light beam issues and thus be more conveniently selected by the sender.

In the embodiment shown in FIG. 8 the panels are arranged in an endless belt 26 about a pair of spaced pulleys 27 and 28 rotatably mounted on a base. Pulley 27 is an idler pulley and pulley 28 is provided with a crank handle 29 by which it may be rotated to move the belt past a slot 30 in a wall 31. A lamp 32 and a condensing lens 33 are mounted back of the slot 30 to project a light beam 34 through the panel in front of the slot. It will be understood that the condensing lens 33 may be of a type to project the light beam without aberration and may be a compound or multiple component lens. To modify the intensity of the light beam a neutral density wedge 35 may be slidably mounted in a support 36 so that by sliding it in one direction or the other the thickness of the wedge in the light beam may be varied. The light intensity at the receiving station may in this manner match the light intensity at the transmitting station.

FIGS. 9, 10 and 11 show an embodiment of the invention in which color panels 37 are arranged as narrow segments of a disc 38 rotatable on an axle 39. The axle 39 is rotatably mounted on a frame 40 having a slot 41 so placed that by rotating the disc the panels may be selectively brought in front of the slot. A lamp 42 supplied with electric current from a battery 43 through a conductor 44 and switch 45 is placed to project a light beam through the slot 41 and color panel in front of the slot. To control the intensity of the light beam a polarizing disc 46, rotatable on an axle 47 on the frame 40 between the slot 41 and the color panel disc 38 may be rotated to modify the polarization of the light beam. The sender does not change the position of his disc.

The manner of using this embodiment is illustrated in FIG. 11. The sender and the receiver of the message may use identical devices. The sender at station A, for example, rotates the disc of his instrument to bring the color panels bearing the characters of the message into position in front of the slot. The receiver at station B sights over the edge of his color disc to observe the color sent by the sender and rotates his color panel disc to bring a matching panel into the slot of his instrument and notes its identifying character. To assist him he may dim his light to any desired extent by rotating his polarizing disc.

FIG. 12 shows a modification of the invention in which light rays of selected color and hue may be sent, any of the receivers illustrated above being used at the receiving station. In this modification, only two lamps 48 and 49 are illustrated for generating colored light sources, for example red and yellow but more than two lamps may be used to obtain other colors. The lamps themselves produce white light. A pair of color filters 50 and 51 are placed between the lamps and a concave reflector 52, there being one filter for each lamp. One filter may, for example be yellow and the other red. These filters may be replaced by filters of other colors such as blue or green. These filters acting singly or in combination have the same function as the color panels of the modifications shown above. Each lamp is supplied with electric current from individual batteries 53 and 54 through rheostats 55 and 56. To produce a colored light beam of a pure color such as blue, red or yellow only one light and one filter need be used. To produce other colors, such as orange, green or purple, two lamps and two color filters may be used.

To produce hues the current to the lamps may be varied by the rheostats 53 and 54. The rheostats may have letter or other character markings to indicate the proper settings to produce the hues corresponding to the letters or characters. When two colors are used, the colors blend in the reflected light beam to produce the color and shade corresponding to the color of the receiving panel of the corresponding letter or character.

The lamps and reflector may be such as to produce a beam of light 57 of any required power, as in a search light for example when a message is to be sent over a longer distance than would be possible with the modifications shown in FIGS. 1 to 11. The light beam may be directed to the receiving station directly or by reflection as illustrated in FIG. 13. As shown in FIG. 13, the light beam from a reflector may be directed to a snow bank, a cloud, a building or other object out of the direct line from the sending station to the receiving station and reflected to the sending station. In such an arrangement two or more receiving stations may receive the message.

The invention provides a system of sending messages that may be of simple construction and may be used by the sender and receiver without the need for learning a code as it is necessary to have the instrument and to read the letters or other characters shown on the panels. Without the sending or receiving instruments the messages cannot be received.

Having described my invention, I claim:

1. A system for sending a message from one station to another which comprises at least two identical series of color panels, one for a sending station and one for each receiving station, each panel of each series having a color hue distinctively different from that of any other panel of the series and each panel having an identifying character, means for moving panels into a beam of white light in a sequence determined by its identifying character to spell a message to be sent and thereby to direct to the receiving station a beam of light of the color hue of said panel, and means at the receiving station to move panels into position for matching said colored beams and the identifying character of each panel into viewing position to receive the message.

2. The system of claim 1 in which hues of a predominant color are arranged in groups.

3. The system of claim 1 in which said panels are arranged for rotation on an axis to bring said panels selectively into the light beam.

4. The system of claim 3 in which said panels are parallel to their axis of rotation.

5. The system of claim 4 in which said panels are in a cylinder formation concentric with the axis of rotation.

6. The system of claim 3 in which said panels are in a plane normal to the axis of rotation.

7. The system of claim 1 in which said panels are arranged in an endless belt and which comprises a pair of spaced, rotatable, pulleys for supporting said belt in position to move said belt.

8. The system of claim 1 comprising an opaque wall between said panels and said light and having an opening in the path of said light beam and means to bring each selected panel into said opening.

9. The system of claim 1 in which each said panel brought into said light beam is positioned to reflect a color beam.

10. The system of claim 1 in which each said panel brought into said light beam is positioned to transmit a color beam.

11. The system of claim 1 comprising a lamp and a condensing lens to generate and direct light to said panels.

12. The system of claim 1 comprising a lamp and a concave reflector for generating and direct a light beam to said panels.

13. The system of claim 1 having a polarizing shield movable into the path of said light beam.

14. The system of claim 13 in which said polarizing shield is rotatable about an axis normal to its plane.

15. A system for sending a message from one station to another which comprises means for transmitting from a sending station to a receiving station a succession of distinctively different color light beams, each color corresponding to a characteristic identifying character, and a series of panels of corresponding color hues at the receiving station, each marked with a corresponding identifying character, said panels being movable individually into said light beam to match the color of the transmitted beam.

16. The system of claim 15 in which said means for transmitting said beams comprises at least two sources of light, each of a different color from the other, and a concave reflector to reflect said colors to the receiving station.

17. The system of claim 16 in which said light sources comprises electric lamps and means for varying individually the intensity of the light from said lamps.

References Cited in the file of this patent

UNITED STATES PATENTS

| | | |
|---|---|---|
| 539,421 | Crowley | May 21, 1895 |
| 2,122,225 | Wheelwright | June 28, 1938 |
| 2,865,988 | Cafarelli | Dec. 23, 1958 |